United States Patent

[11] 3,630,182

[72] Inventor Lewis M. D. Grainger
  Route #1, Glen Allen, Va. 23060
[21] Appl. No. 46,938
[22] Filed June 17, 1970
[45] Patented Dec. 28, 1971

[54] ANTIPOLLUTION SYSTEM FOR INTERNAL COMBUSTION ENGINES
  5 Claims, 6 Drawing Figs.
[52] U.S. Cl. ..................................................... 123/119 B, 60/30 R
[51] Int. Cl. .................................................... F02f 9/02, F02m 25/06, F02m 23/06
[50] Field of Search ........................................ 123/119 B, 41.86; 60/30 R; 55/250, 259

[56] References Cited
  UNITED STATES PATENTS
| | | | |
|---|---|---|---|
| 3,392,523 | 7/1968 | Hyde et al. | 60/30 |
| 3,059,420 | 10/1962 | Schnabel | 60/30 |
| 3,246,639 | 4/1966 | Oliver | 123/119 B |
| 1,524,540 | 1/1925 | Dawdy | 123/119 B |
| 2,137,054 | 11/1938 | Kamrath | 55/250 X |
| 3,157,169 | 11/1964 | Drysdale | 123/119 B |
| 3,418,986 | 12/1968 | Scherenberg | 123/119 B |
| 1,950,586 | 3/1934 | Zubaty | 123/119 B |
| 1,761,970 | 6/1930 | Clason | 123/119 B |
| 3,433,242 | 3/1969 | Voorheis | 60/30 |
| 3,264,804 | 8/1966 | Sendelbach | 55/259 X |

*Primary Examiner*—Mark M. Newman
*Assistant Examiner*—R. B. Rothman
*Attorney*—Elton H. Brown, Jr.

ABSTRACT: An antipollution system for internal combustion engines in which a blower-forming part of the fan blade of the engine draws fumes from the crankcase of the engine and feeds the fumes along with fresh air through a heat exchanger to heat the gases and then to an oil bath air cleaner air intake of the carburetor. A portion of the fumes and air are fed to an exhaust-gas-pollution-burning device.

INVENTOR.
LEWIS M. D. GRAINGER,
BY
Elton H Brown, Jr.

INVENTOR.
LEWIS M. D. GRAINGER,
BY
Elton H. Brown, Jr.

INVENTOR.
LEWIS M. D. GRAINGER,
BY
Elton H. Brown, Jr.

# ANTIPOLLUTION SYSTEM FOR INTERNAL COMBUSTION ENGINES

CROSS REFERENCE TO RELATED APPLICATION

The system of the present application is adapted to be used with the system of my copending application Ser. No. 27,251 filed Apr. 10, 1970 and entitled "Anti Pollution System for Internal Combustion Engines." While the systems of my copending applications are adapted to be connected together and used with a single engine it should be understood that either system may be used alone.

BACKGROUND OF THE INVENTION

Field of the Invention

The present invention relates to antipollution systems for internal combustion engines and more particularly to such systems which eliminate fumes from the crankcase of the engine.

SUMMARY OF THE INVENTION

The present invention includes a ducted radiator fan having an integral blower formed in conjunction therewith which draws fumes from the crankcase of an internal combustion engine and feeds them to either an exhaust-gas-burning device or to the air intake of an oil bath air cleaner attached to the air intake of a carburetor.

The primary object of the invention is to provide an antipollution system for automobiles which will completely eliminate the fumes from the crankcase and which will supply air to an oil bath air cleaner in sufficient quantity so that the engine is supercharged to gain the advantages thereof.

Other objects and advantages will become apparent in the following specification when considered in the light of the attached drawings.

DESCRIPTION OF THE PREFERRED EMBODIMENT

Figure 1:
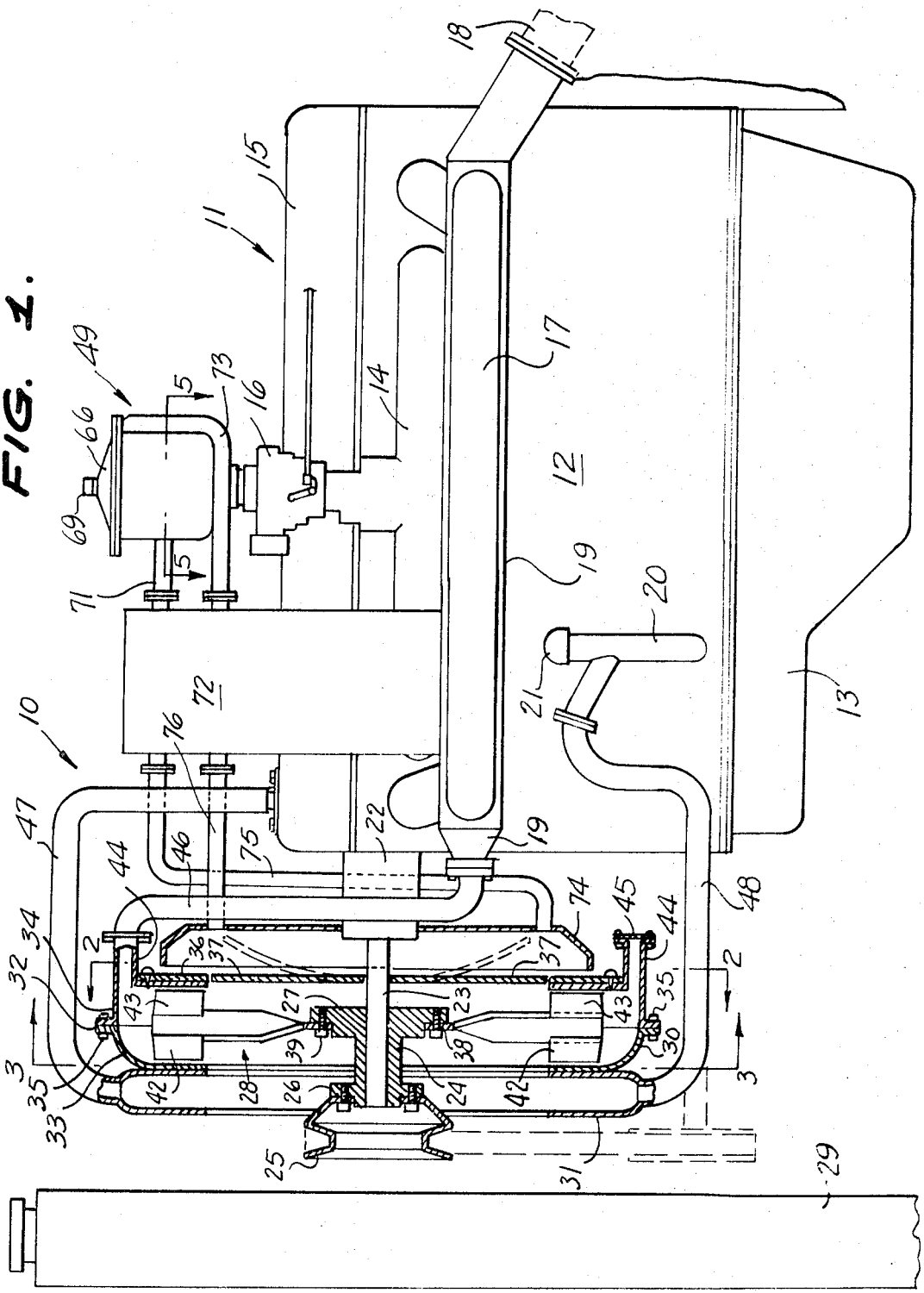
FIG. 1 is a side elevation of the invention shown partially broken away and in section for convenience of illustration.
Figure 2:
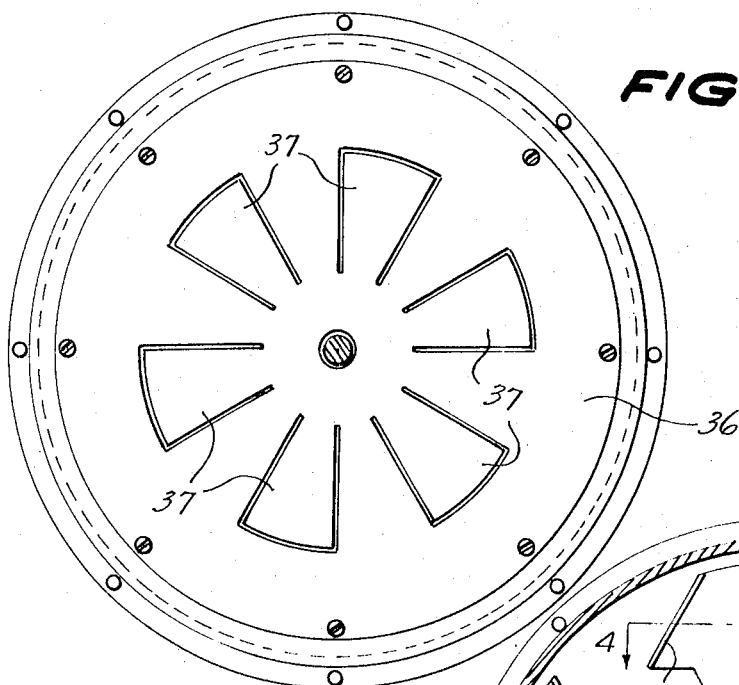
FIG. 2 is a transverse sectional view taken along the line 2—2 of FIG. 1, looking in the direction of the arrows.
Figure 3:
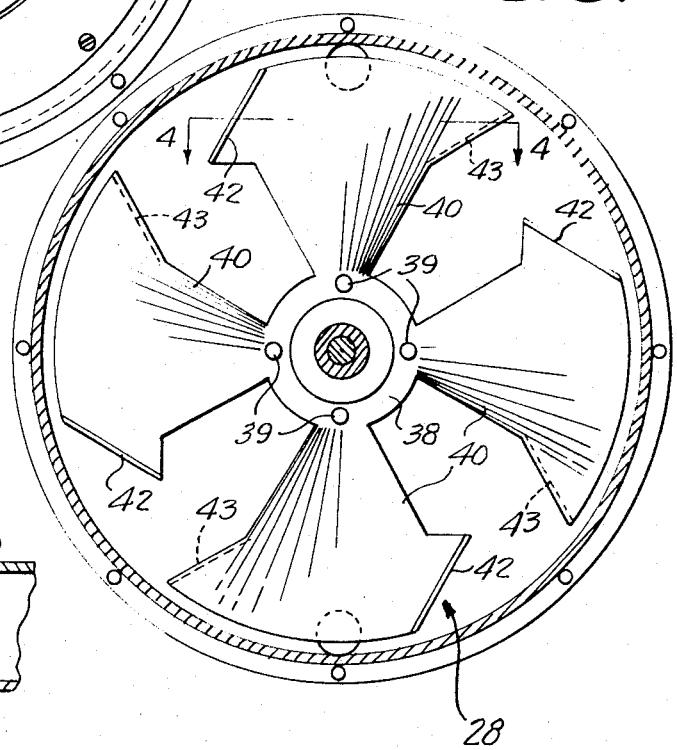
FIG. 3 is a transverse sectional view taken along the line 3—3 of FIG. 1, looking in the direction of the arrows.
Figure 4:
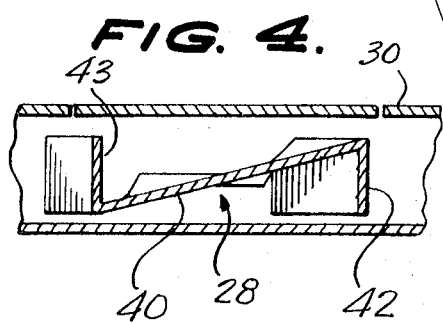
FIG. 4 is a fragmentary horizontal sectional view taken along the line 4—4 of FIG. 3, looking in the direction of the arrows.
Figure 5:
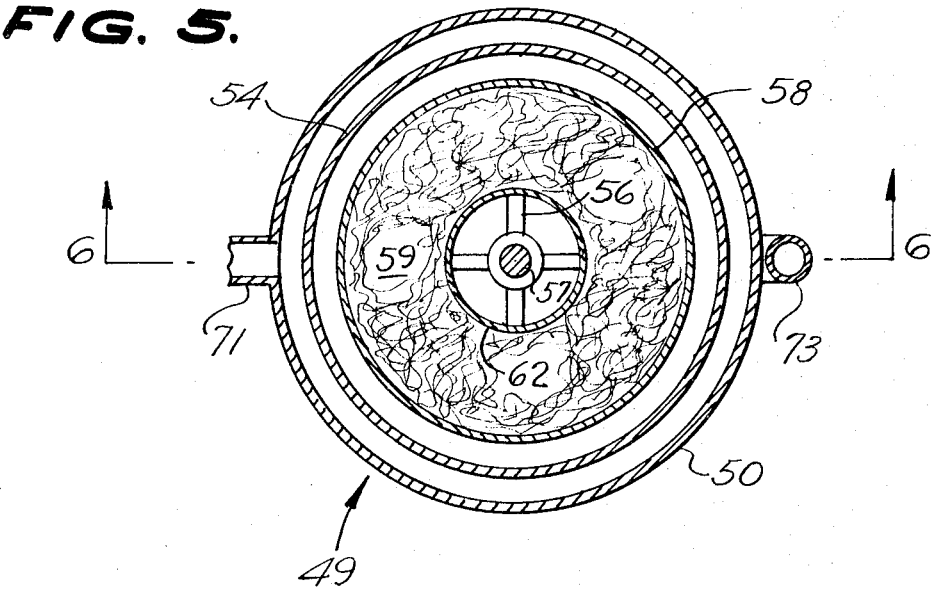
FIG. 5 is an enlarged fragmentary horizontal cross section taken along the line 5—5 of FIG. 1, looking in the direction of the arrows.
Figure 6:
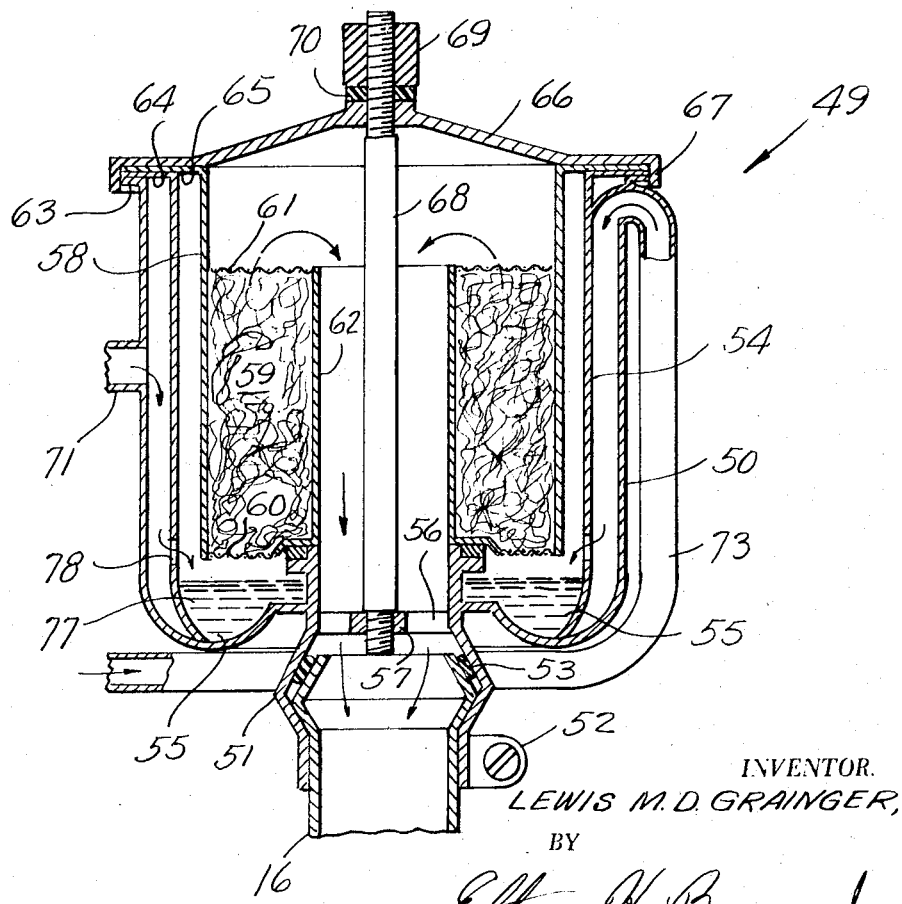
FIG. 6 is a vertical sectional view taken along the line 6—6 of FIG. 5, looking in the direction of the arrows.

Referring now to the drawings in detail wherein like reference characters indicate like parts throughout the several figures the reference numeral 10 indicates generally an antipollution system for an internal combustion engine indicated generally at 11 constructed in accordance with the invention.

The internal combustion engine 11 is of conventional design having a block 12, crankcase 13, intake manifold 14, valve cover 15, carburetor 16, and an exhaust manifold 17. An exhaust pipe 18 is connected to the exhaust manifold 17 for removing the exhaust gases to the exhaust system.

An exhaust gas burner system 19 is attached to the internal combustion engine 11 and is more fully explained in my above-identified copending application. An oil filler pipe 20 is connected to the block 12 for feeding oil into the crankcase 13 in a conventional manner. The oil filler pipe 20 is closed by a removable cap 21 in a conventional manner.

The internal combustion engine 11 has a conventional water pump 22 mounted to the forward end thereof and having a drive shaft 23 extending longitudinally forwardly therefrom. A hub 24 is detachably secured to the forward end of the shaft 23 and has a drive pulley 25 detachably secured to the forward flange 26 thereof. A rear flange 27 is formed on the hub 24 and has a fan blade indicated generally at 28 detachably secured thereto. The radiator 29 is positioned forwardly of the fan 28 and is cooled by air drawn through the radiator 29 by the fan 28.

A split shroud 30 surrounds the fan 28 and an air intake housing 31 is secured to the shroud 30 for forwardly thereof. The split shroud 30 is divided along a transverse vertical plane 32 into a forward half 33 and a rear half 34 which are secured together by bolts 35. A vane plate 36 of generally circular form is secured to the rear half 34 of the shroud 30 to normally close the central outlet of the shroud. The vane plate 36 is of spring steel construction and has a plurality of wedge shaped vanes 37 formed therein for movement from the plane of the plate 36 rearwardly as illustrated in dotted lines in FIG. 1.

The fan 28 includes an annular hub 38 secured to the flange 27 by a plurality of bolts 39. Extending radially outwardly form the hub 38 is a plurality of fan blades 40 which are sloped to move air longitudinally of the engine 11 axially through the shroud 30 and the housing 31. Each of the fan blades 40 has laterally oppositely extending blower segments 42, 43 which are sloped with respect to the radius of the shaft 23 in the direction of rotation. The segments 42, 43 are positioned on the blades 40 radially outwardly of the axial openings in the shroud 33 and force air outwardly therein. A pair of rearwardly extending air outlet conduits 44 are formed on the shroud 30 to convey air rearwardly from the shroud 30. One of the outlet conduits 44 is provided with a removable cap 45 as shown in FIG. 1 and is uncapped when attaching the device to a V-type engine. A conduit 46 is connected to the other conduit 44 and extends to an exhaust gas burner unit 19 which is more fully described in my copending application identified above.

A conduit 47 extends from the valve cover 15 to the housing 31 to convey fumes from the valve chamber to the housing 31. A conduit 48 extends from the oil filler pipe 20 to the housing 31 to convey fumes from the crankcase 13 to the housing 31.

An oil bath air cleaner indicated generally at 49 is attached to the carburetor 16 and includes an outer generally cylindrical housing 50 having a conduit 51 extending downwardly therefrom and terminating in a clamp 52 to secure the conduit 51 to the carburetor 16. A gasket 53 may be provided for sealing a connection between the carburetor 16 and the conduit 51.

An inner cylindrical wall 54 is secured to the outer cylindrical wall 50 in radially inwardly spaced relation and forms an oil sump 55 at the lower end thereof. A web 56 extends across the conduit 51 and has a threaded bore 57 arranged axially therein. A cylindrical filter support 58 is positioned within the inner cylindrical wall 54 in spaced apart relation thereto and has a filter 59 mounted thereon between lower annular screens 60 and upper annular screens 61. The filter 59 has a cylindrical conduit 62 extending vertically therethrough coinciding in diameter with the upper end of the conduit 51. The outer cylindrical wall 50 has an outwardly extending annular flange 63 formed on its upper edge. The inner cylindrical wall 54 has an outwardly extending annular flange 64 formed on its upper edge. The filter support wall 58 has an outwardly extending annular flange 65 formed on its upper edge. The annular flange 64 is supported on the annular flange 63 and the annular flange 65 is supported on the annular flange 64. The annular flanges 63, 64, 65 may have suitable seals or gaskets (not shown) arranged therebetween. A cover 66 is provided with a depending annular flange 67 which engages the outer edges of the annular flanges 63, 64, 65 and is secured to the air cleaner 49 by a bolt 68 threaded at one end into the threaded bore 57 and into a nut 69 at the other end which engages the cover 66 through a gasket 70. An air conduit 71 extends from one side of the air cleaner 49 communicating with the space between the wall 50 and the wall 54. The air conduit 71 extends to and is connected with a conventional heat exchanger 72 connected to or forming a part of the exhaust gas system of the engine 11. An air conduit 73 is connected to the air filter 49 communicating with the space between the walls 50 and 54 oppositely of the air conduit 71. The air conduit 73 is also connected to the heat exchanger 72. An annular air collector housing 74 is mounted on the water pump 22 immediately to the rear of the shroud 30 and has a conduit 75 extending therefrom to the heat exchanger 72 to provide air to the conduit 71. A second air conduit 76 extends from the housing 74 to the heat exchanger 72 to provide air for the air conduit 73. Air flowing through the conduits 75, 76 is heated in the heat exchanger 72 before being fed to the air cleaner 49 through the conduits 71, 73.

In the use and operation of the invention the engine 11 is started and initially operates at relatively low speed. At low-speed operation the vanes 37 remain closed and all or nearly all of the air being moved by the fan 28 and the sectors 42, 43 moves through the conduit 44 to the exhaust gas pollution burner 19. A relatively high suction is developed in the housing 31 and the fumes from the crankcase 13 and the valve chamber 15 are removed and are burnt in the exhaust gas burner 19. Air for the air cleaner 49 will flow in and around the edge of the housing 74 and ample air will be thus provided for operating the engine 11 at low speed. At the speed of the engine 11 is increased and the fan 28 turns at a higher r.p.m. a greater volume of air and a higher pressure is attained in the shroud 30 so that the vanes 37 are forced rearwardly permitting at least some of the air in the shrouds 30 to escape to the rear into the housings 74. As the speed of the engine reaches the maximum the vanes 37 open the maximum and the air flowing in the conduit 75, 76 is under pressure so that a supercharging action is provided for the carburetor 16 forcing air therein at a rate greater than the suction of the engine 11 would have provided.

As the air flows through the conduits 71, 73 into the air cleaner 49 it flows downwardly between the outer wall 50 and the inner wall 54 to a point slightly above the oil pool 77 on the sump 55. The air flows inwardly through a plurality of ports 78 in the wall 54 and then upwardly through the filter 59 and then downwardly through the conduit 62 into the carburetor 16.

The provision of the shroud 30, sectors 42, 43 and the low-speed direction of the air through the conduit 46 maintains a high flow of air to the exhaust burner 19 even at very-low engine speeds so that all of the pollutents in the exhaust gases of the engine 11 are consumed.

Having thus described the preferred embodiment of the invention it should be understood that numerous structural modifications and adaptations may be resorted to without departing from the spirit of the invention.

What is claimed is:

1. An antipollution system for internal combustion engines of the type which includes a carburetor, an exhaust manifold, an oil filler pipe, a valve chamber, and an exhaust gas pollution burner; comprising a combined fan and blower mounted on said engine, means for conducting air from said combined fan and blower to said carburetor, and means controlled by the speed of rotation of said combined fan and blower for directing a greater ratio of air to said exhaust burner at low fan speeds and a greater ratio of air to said carburetor at higher fan speeds, said last named means including a plurality of spring vanes opened by the force of air from said fan to feed air to said carburetor.

2. A device claimed in claim 1 wherein a conduit extends from said oil filler pipe to said combined fan and blower for removing fumes from said crankcase.

3. A device as claimed in claim 1 wherein a conduit extends from said valve chamber to said combined fan and blower to remove fumes from said valve chamber.

4. A device as claimed in claim 1 wherein means are provided for heating the air from said combined fan and blower prior to delivery to said carburetor.

5. A device as claimed in claim 1 wherein an oil bath air cleaner is mounted on said carburetor and the air is directed thereto by said conduit means, said air cleaner including an outer annular passage for producing a downward air flow, an oil sump at the bottom of said air cleaner across which the air flows, an annular filter through which the air flows upwardly and a axial conduit connected to the carburetor through which the air flows downwardly from the filter.

* * * * *